United States Patent [19]
Kuang

[11] Patent Number: 5,264,764
[45] Date of Patent: Nov. 23, 1993

[54] METHOD FOR CONTROLLING THE OPERATION OF A RANGE EXTENDER FOR A HYBRID ELECTRIC VEHICLE

[75] Inventor: Ming L. Kuang, Detroit, Mich.

[73] Assignee: Ford Motor Company, Dearborn, Mich.

[21] Appl. No.: 994,379

[22] Filed: Dec. 21, 1992

[51] Int. Cl.⁵ .............................................. B60L 11/12
[52] U.S. Cl. .................................. 318/139; 180/65.4; 290/14; 290/16
[58] Field of Search ............... 318/139; 180/65.1, 65.2, 180/65.3, 65.4; 290/8, 9, 10, 11, 14, 16, 17, 45, 50

[56] References Cited

U.S. PATENT DOCUMENTS

| | | | |
|---|---|---|---|
| 3,623,568 | 11/1971 | Mori . | |
| 3,719,881 | 3/1973 | Shibata et al. . | |
| 3,792,327 | 2/1974 | Waldorf | 318/139 |
| 4,008,423 | 2/1977 | Christianson et al. | 318/139 |
| 4,165,795 | 8/1979 | Lynch et al. | 318/139 X |
| 4,187,436 | 2/1980 | Etienne | 290/27 |
| 4,301,396 | 11/1981 | Bourke | 318/490 |
| 4,305,254 | 12/1981 | Kawakatsu et al. | 60/716 |
| 4,306,156 | 12/1981 | Monaco et al. | 318/139 X |
| 4,313,080 | 1/1982 | Park . | |
| 4,335,429 | 6/1982 | Kawakatsu | 364/424 |
| 4,363,999 | 12/1982 | Omae et al. | 318/338 |
| 4,691,148 | 9/1987 | Nicholls et al. | 318/12 |
| 4,730,151 | 3/1988 | Florey et al. | 318/376 |
| 4,928,227 | 5/1990 | Burba et al. | 364/424.01 |
| 5,081,365 | 1/1992 | Field et al. | 290/45 |
| 5,107,191 | 4/1992 | Lowndes et al. | 318/139 |
| 5,115,183 | 5/1992 | Kyoukane et al. | 180/65.2 X |

OTHER PUBLICATIONS

"Electric Hybrid Drive Systems for Passenger Cars and Taxis", A. Kalberlah, Electric Vehicle Design and Development, Feb., 1991, pp. 69–77.

*Primary Examiner*—Bentsu Ro
*Attorney, Agent, or Firm*—Roger L. May; Peter Abolins

[57] ABSTRACT

A method for controlling the operation of a range extender of a hybrid electric vehicle in which a requested power signal $P_{req}$ is generated in response to the state-of-charge of the battery system being less than a predetermined intermediate value and the energy being consumed by the electric drive system being greater than the electric energy being delivered by the range extender. The requested power signal having a value approximately equal to the average power consumed by the electric drive system in a preceding time period. The method is responsive to the motor being in a energy regenerative state to decrease the power being generated by the range extender so that all the energy being generated by the motor is used to charge the battery. The method is also responsive to the engine temperature exceeding a predetermined temperature to reduce the power being delivered by the range extender. The power delivered by the range extender in response to the requested power signal is applied to the electric drive system and battery system to maintain the state-of-charge of the battery system is maintained within a predetermined range.

15 Claims, 4 Drawing Sheets

METHOD FOR CONTROLLING THE OPERATION OF A RANGE EXTENDER FOR A HYBRID ELECTRIC VEHICLE

TECHNICAL FIELD

The invention is related to the field of hybrid electric vehicles having a range extender and, in particular, the invention is related to a method for controlling the range extender.

BACKGROUND ART

A range extender in a hybrid electric vehicle consists of a small internal combustion engine which drives an alternator to produce electrical energy. This electrical energy supplements the electrical energy produced by a battery or battery system to power the electric motor powering the drive system of the vehicle. Range extenders are used to extend the limited range of purely electric vehicles. Because current battery technology cannot provide the required electrical energy to give a pure electric vehicle sufficient range, a hybrid electric vehicle having a range extender offers a compromise between an internal combustion powered vehicle and a pure electric vehicle. This compromise improves vehicle performance and extends the vehicle's range while keeping emissions minimal.

One approach toward achieving the objectives of a range extender is described by A. Kalberlas in an article "Electric Hybrid Drive Systems For Passenger Cars And Taxis", ELECTRIC VEHICLE DESIGN AND DEVELOPMENT, published by the SAE in February 1991. This article teaches the use of a small internal combustion engine operated at fixed operating points within its engine speed/torque map. The fixed operating points are selected so that the engine is operated to deliver maximum energy compromising both efficiency and emissions. A corresponding approach is disclosed by Michel Elienne in U.S. Pat. No. 4,187,436.

The disadvantage of these range extender systems is that the internal combustion engines are operated at a fixed speed causing the electrical energy generated by the associated alternator to be greater than electrical energy demanded by the operator most of the time during each trip. The excess energy is used to charge the batteries. Consequently, a considerable portion of the electrical energy generated by the range extenders of the prior art is converted to chemical energy in the batteries. Because the efficiency of converting electrical energy into chemical energy, and vice versa, is low, the electrical energy generated by the alternator charging the batteries is an inefficient use of this electrical energy. Another disadvantage of the range extenders taught by the prior art is that the batteries may be charged to a nearly fully charged state. This approach is not desirable because charging the batteries by electricity from a conventional source of electrical energy, such as a household source of energy, as opposed to charging the batteries by the range extender minimizes the use of gasoline which, in turn, minimizes the emissions of the internal combustion engine. Additionally, the life of the batteries may be shortened due to the high charging rate of the prior art range extender systems.

The invention is a method for controlling a range extender, to supply the electric drive system of the vehicle with electric power corresponding to the average electric power being consumed in a preceding time period, to control the range extenders delivered power so that a majority of regenerative braking energy is used to charge the battery, to control the rate of charge of the battery and to prevent the internal combustion engine from overheating.

SUMMARY OF THE INVENTION

The invention is a method for controlling the operation of a range extender for a hybrid electric vehicle having a battery system providing electric power to an electric drive system. The electric drive system includes a motor having a first state in which the motor functions as an electric motor and switchable to a second state in which the motor functions as an electric generator driven by the wheels of the vehicle. The range extender consists of an alternator powered by an internal combustion engine. The speed of the internal combustion engine is controlled by a requested power signal $P_{req}$ which has a value corresponding to an engine speed which would cause the alternator to provide a desired delivered electric power.

The method comprises measuring the battery system's state-of-charge, the electric power consumed by the electric drive system, and the electric power being delivered by the range extender then generating a requested power signal $P_{req}$ in response to an average of the consumed electrical power and the value of the state-of-charge of the battery system being less than a predetermined intermediate value and the difference between the values of the consumed energy $P_{con}$ and the delivered energy $P_{del}$ being greater than a predetermined difference. The generated requested power signal having a value causing the range extender to deliver sufficient electrical energy to the electric drive system and to the battery system to maintain the state-of-charge of the battery system within a predetermined range.

The method may include controlling the electric power delivered by the range extender in response to the motor being in the second state to prohibit the sum of the electric power generated by the motor in the second state and the delivered power, $P_{del}$, generated by the range extender from exceeding a maximum charge rate of the battery system.

The method may also include reducing the electric power being delivered by the range extender in response to the temperature of the coolant of the range extender engine exceeding a predetermined temperature.

One advantage of the method for controlling the operation of the range extender is that the range extender supplies the electric drive system with electric energy approximately equal to the electric energy consumed in each trip.

Another advantage is that all available regenerative braking energy is used to charge the battery system.

Still another advantage is that the method controls the rate charge of the battery.

A final advantage is that the method controls the electric power being delivered by the range extender to prevent the range extender engine from overheating.

These and other advantages will become more apparent from reading the specification in conjunction with the drawings.

DETAILED DESCRIPTION OF THE INVENTION

Figure 1:
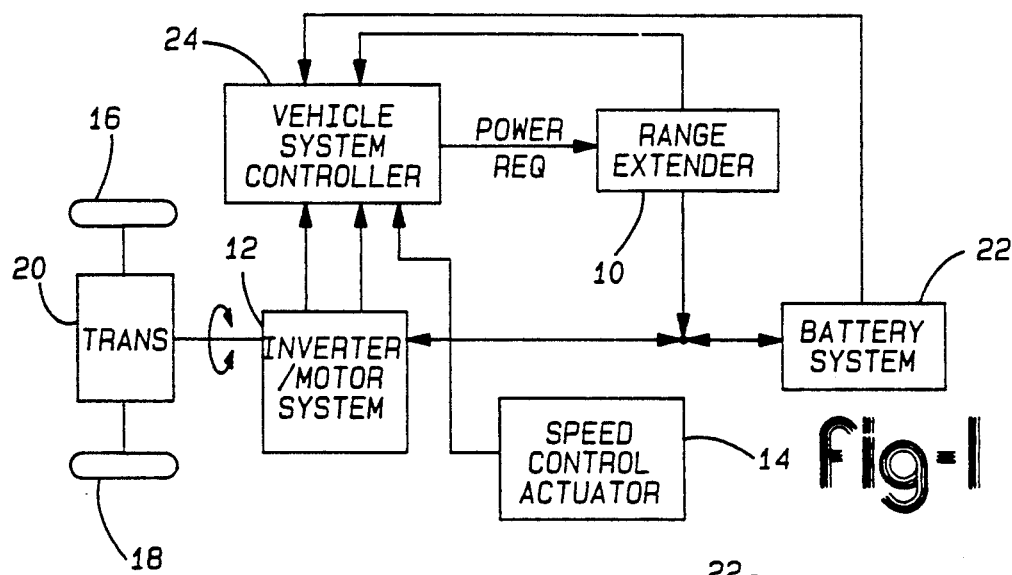
FIG. 1 is a block diagram of the hybrid electric vehicle.
Figure 2:
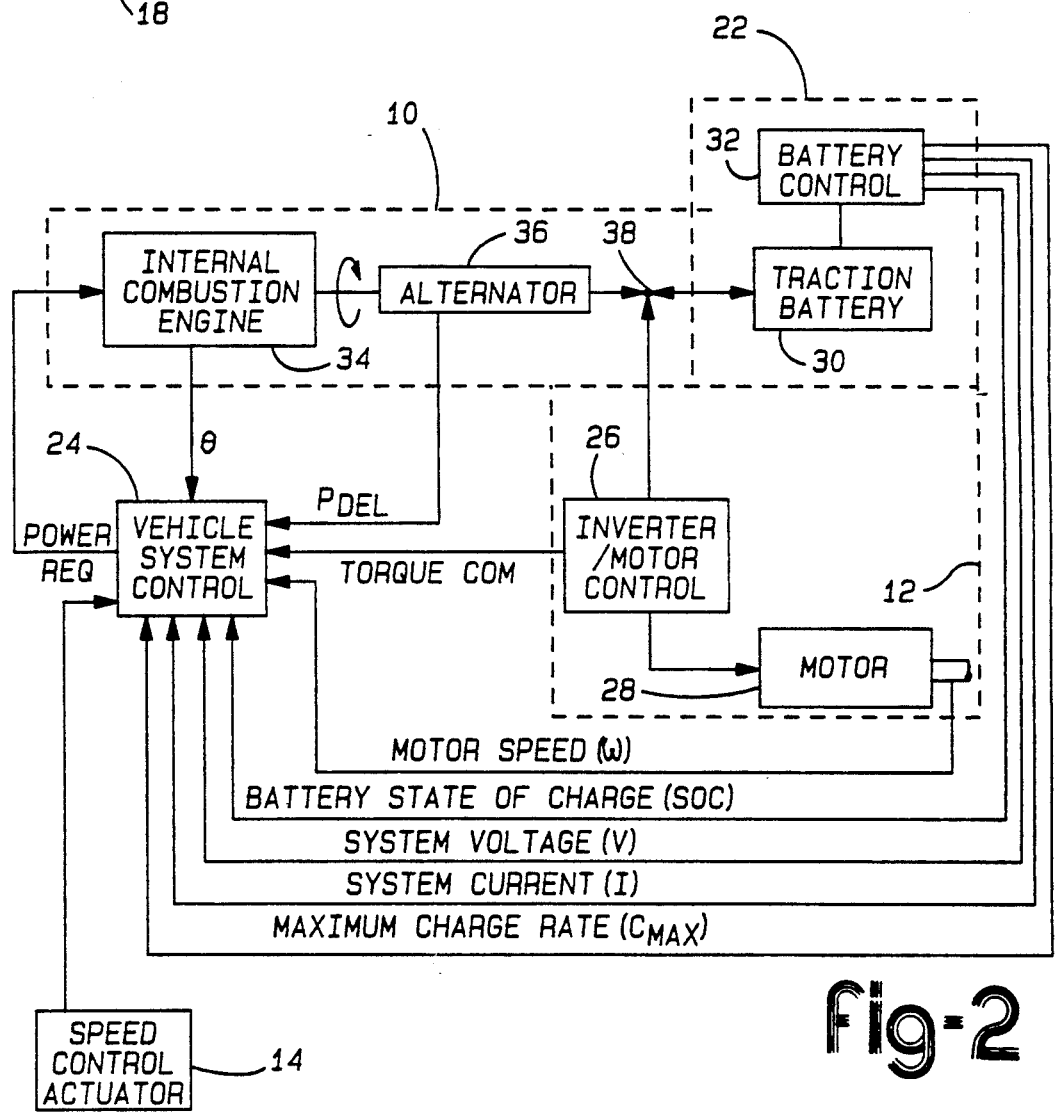
FIG. 2 is a block diagram showing the subcomponents of the blocks in FIG. 1.

FIG. 1 shows the power train of a hybrid electric vehicle having a range extender 10 which improves the travel range and performance of the hybrid electric vehicle over the travel range and performance of a purely electric vehicle. The hybrid electric vehicle has an inverter/motor electric drive system 12 responsive to a torque command signal generated by a vehicle system controller 24 in response to the position of a speed control actuator 14 to produce a rotary output which is transmitted to the road engaging wheels 16 and 18 of the hybrid electric vehicle through a transmission 20. The inverter/motor electric drive system 12 receives electric power from the range extender 10 and a battery system 22. As is common in the art, the speed control actuator 14 consists of a hand or foot actuated control and an actuator position sensor which generates an electrical signal having a value proportional to the displacement of the control actuator from a fixed position, which normally is the off position. The speed control actuator 14 may also include an off position switch actuated by the speed control actuator when the speed control actuator is in the off position. The signal generated by the off position switch is transmitted to the vehicle system controller 24, the vehicle system controller then generates the torque command signal to the inverter/motor control 26 as shown in FIG. 2 and converts the motor 28 to an electrical generator. Thus, when the vehicle is coasting and the control actuator has been returned to its off position, the motor 28 is driven by the road engaging wheels and will produce an electric output capable of charging the traction battery 30 of the battery system 22 when the voltage of the electrical output of the motor 28 is higher than the voltage of the traction battery 30.

A vehicle system controller 24 generates a requested power signal which actuates the range extender 10 to provide the requested electric power to the inverter/motor system 26 and/or the traction battery. For efficiency and emissions reasons, the range extender 10 will only be actuated by the requested power signal when the charge of the traction battery falls to a preselected state of charge, such as 35% of its fully charged value and will be turned off when the charge of the traction battery 30 has been restored or recharged to a value intermediate a discharged state and a full charge state, such as 45% of its full charge value.

As more clearly shown in FIG. 2, the range extender 10 consists of an internal combustion engine 34 which rotationally drives an alternator 36. The alternator 36 outputs electric power having a value proportional to speed at which it is driven by the internal combustion engine 34. The rotational speed of the internal combustion engine 34 is controlled by the requested power signal generated by the vehicle system control 24.

The electric power generated by the alternator 36 is applied to an electrical junction 38 from where it may be directed to recharge the traction battery 30 or may be applied directly to the motor 28 through an inverter/motor control 26. The inverter/motor control 26 is responsive to the torque command signal generated by the vehicle system controller 24 to provide electric power from the traction battery and/or the range extender 10 to the motor 28 sufficient to propel the vehicle at the desired speed. The inverter/motor control 26 is also responsive to the signal generated by the off position switch which is turned on when the speed control actuator 14 is in the off position to generate a "regen" signal which activates the motor 28 to function as an electrical generator. This "regen" signal is also transmitted to the vehicle system control signifying that the inverter/motor is acting as an electric generator regeneratively braking the hybrid vehicle. In response to the "regen" signal, the vehicle system control 24 will control the speed of the internal combustion engine to prevent the sum of the electric power generated by the inverter/motor system 12 and the electrical power generated by alternator 36 from exceeding the maximum charge rate $C_{max}$ of the traction battery 30. The maximum charge rate of the traction battery 30, as is known in the art, is a function of the current state-of-charge of the traction battery 30 and its current temperature.

The battery control 32 measures the temperature of the battery and its state-of-charge (SOC) and computes the maximum charging rate ($C_{max}$) which, along with the battery's current state-of-charge, is transmitted to the vehicle system control 24. The battery control 32 also measures and transmits to the vehicle system control 24 the value of the electric current I being delivered by the traction battery 32 and the voltage V at which this current is being delivered. Effectively, the electric power being delivered by the traction battery in kilowatts (kw) is (IxV)/1000, where I is in amperes and V is in volts. The vehicle system control also receives a signal indicative of the coolant temperature $\theta$ of the internal combustion engine 34, the delivered power ($P_{del}$) delivered by the alternator 36, and the rotational speed $\omega$ of the motor 28.

The operation of the range extender 10 is controlled by a range extender subroutine called-up by the master program of the vehicle system control 24 when the state-of-charge (SOC) of the traction battery falls below a predetermined value, such as 35%, of its full charge value. The details of the range extender subroutine, hereinafter called "routine," are shown in the flow diagram presented in FIG. 3. The function of this routine is to compute the electric power to be generated by the range extender 10 to improve the travel range and performance of the hybrid electric vehicle.

Figure 3:
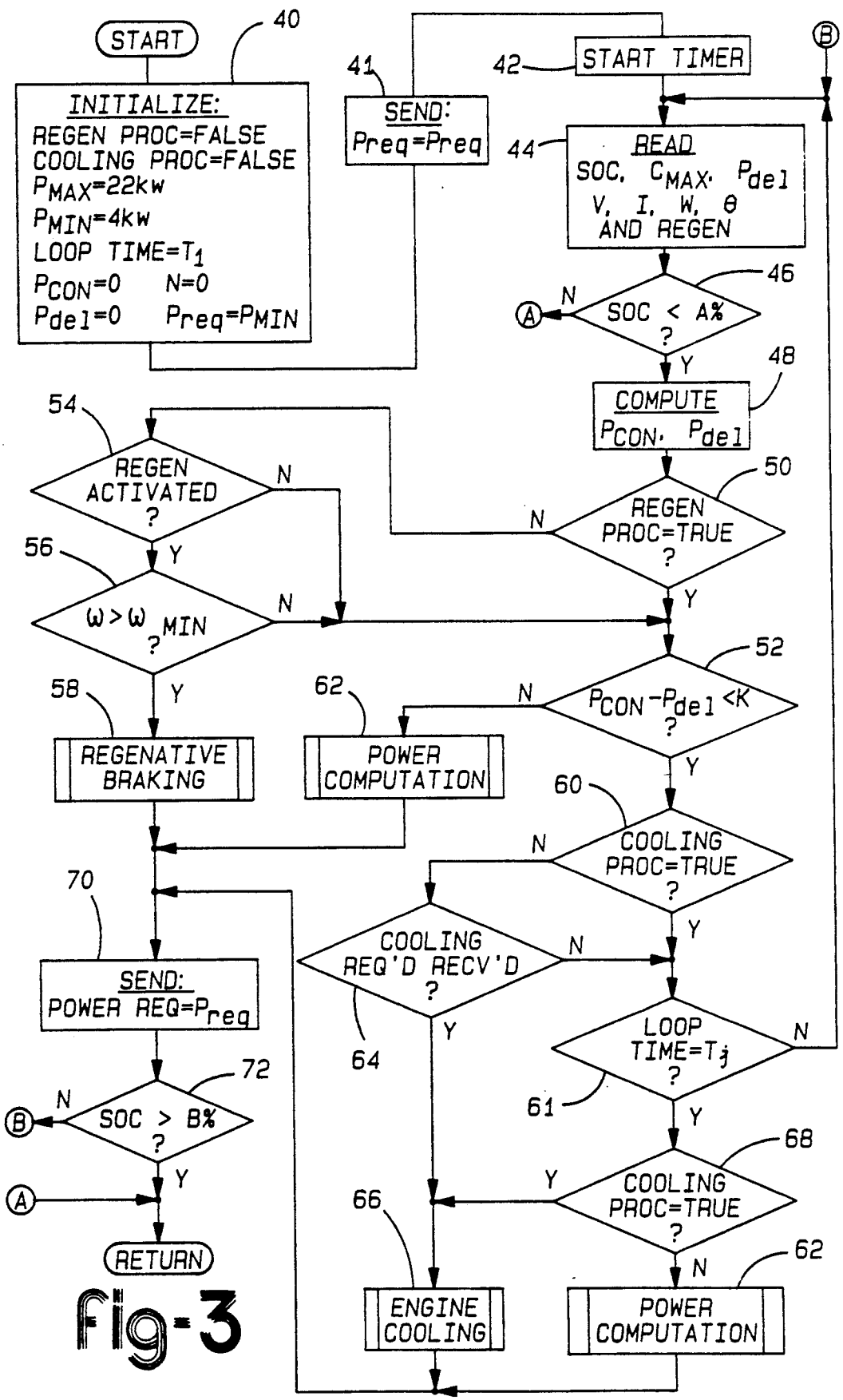
FIG. 3 is a flow diagram of the main routine for controlling the range extender.

Referring to FIG. 3, the range extender routine begins by initializing the system as indicated in block 40. During this initialization, a regen process flag is set to false, a cooling process flag is set to false, the maximum power $P_{max}$ is set equal to 22 kw, the minimum power $P_{min}$ is set to 4 kw, the loop time is set equal to $T_1$, and the loop timer is reset to 0, the energy being consumed by the inverter/motor system 12 ($P_{con}$), the energy delivered by the range extender ($P_{del}$) and the number of loops N are set to 0. The initialization also sets the requested power ($P_{req}$) equal to the minimum power output of the range extender ($P_{min}$). The loop time $T_1$ is selected to be in the range from 1 minute to 3 minutes having a preferred time of 2 minutes. The requested power $P_{req}$ is then sent to the range extender as indicated by block 41.

After the sending of the requested power signal, the range extender routine will start the loop timer as indicated by block 42 then reads and stores the state-of-charge (SOC) and, the maximum charge rate ($C_{max}$) generated by the battery control 32, the power being delivered by the range extender 10 ($P_{del}$), the voltage (V) being produced by the traction battery 30, the current (I) being delivered by the traction battery, the temperature $\Theta$ of the coolant of the engine 34, the existence or absence of a "regen" signal, and the rotational speed ($\omega$) of the motor 28 as indicated by block 44. An engine temperature $\theta$ greater than a predetermined temperature will result in the setting of a cooling process flag to true and the existence of a "regen" signal may result in the resetting of a regen process flag to true as shall be explained hereinafter, otherwise these flags remain false.

The range extender routine will then inquire if the battery's state-of-charge (SOC) is less that a predetermined percentage A of full charge. In the current embodiment, this predetermined percentage A has an intermediate value, such as 45% of a full charge. If the state-of-charge of the battery is greater than A, the subroutine will return to the master program as indicated, otherwise the range extender routine will proceed to compute the sum of the power ($P_{con}$) being consumed by the vehicle, and the sum of the power ($P_{del}$) being delivered by the range extender 10 as indicated by block 48.

The sum of the power ($P_{con}$), hereinafter called the consumed energy, is computed in accordance with the equation (1):

$$P_{con} = \sum_{i=1}^{N} [(V \times I)/1000] + p_{del} \quad (1)$$

and the sum of the power delivered by the range extender 10 hereinafter called delivered energy $P_{del}$, is calculated in accordance with equation (2):

$$P_{del} = \sum_{i=1}^{N} p_{del} \quad (2)$$

where $p_{del}$ is the instantaneous value of the delivered power in kilowatts, during each loop (i) of the range extender routine, and N is the number of loops executed during the range extender routine.

After computing $P_{con}$ and $P_{del}$, the range extender routine inquires, decision block 50 if the regen process flag has been set to true by the regenerative braking subroutine 58. The regenerative braking subroutine 58 is activated when a "regen" signal has been generated by the inverter/motor control 26 in response to the off position switch of the speed control actuator 14 being activated, as indicated by decision block 54 and the inverter/motor speed ($\omega$) being greater than a predetermined minimum inverter/motor speed ($\omega_{min}$) as indicted by decision block 56. The minimum inverter/motor speed $\omega_{min}$ is the lowest inverter/motor speed capable of producing a voltage sufficiently high to charge the battery system. In response to the absence of a "regen" signal or the rotation speed $\omega$ of the motor 28 being less than the minimum rotation speed $\omega_{min}$, the range extender routine will proceed to inquire, decision block 52, if the consumed energy $P_{con}$ minus the delivered energy $P_{del}$ is less than a predetermined difference K.

Figure 4:
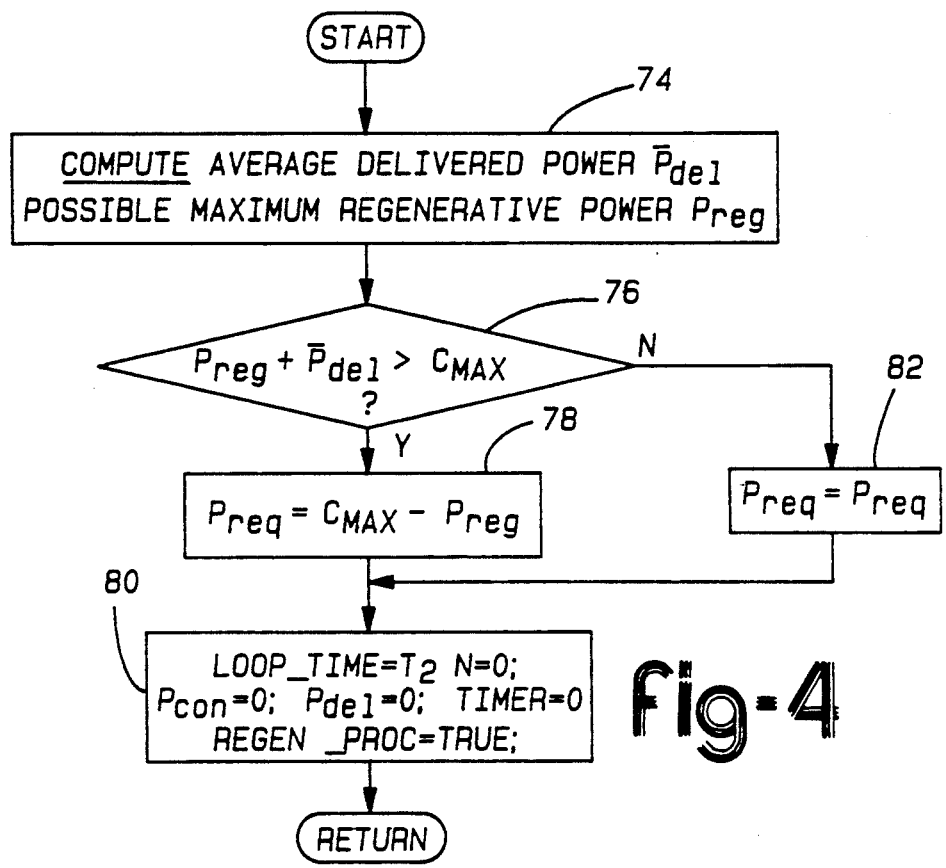
FIG. 4 is a flow diagram of the regenerative braking subroutine.

In the regenerative braking subroutine 58, as shall be explained relative to the flow diagram shown in FIG. 4, the regen process flag will be set to true, indicating the regenerative braking subroutine is being executed and the timer is set for a predetermined time $T_2$. When the regen processor flag is true, the range extender routine will proceed through decision blocks 52 and 60 to decision block 61, and continuously loop from block 44 through decision block 61 until the loop time is equal to $T_2$. Since the regenerative braking subroutine 58 sets $P_{con}$ equal to zero, decision block 52 has no effect when the region process flag is set true. The regenerative braking subroutine may, however, be interrupted when the engine coolant temperature $\theta$ rises above a predetermined value. After the loop timer expires, the range extender routine will proceed through decision block 68 and eventually execute the power computation subroutine 62 which resets the regen process flag to false.

Returning to decision block 52, if the consumed energy $P_{con}$ minus the delivered energy $P_{del}$ is less than K, the range extender routine will proceed to inquire, decision block 60, if the cooling process flag is set to true, indicating that the engine cooling subroutine 66 is being executed, otherwise the range extender routine will execute the power computation subroutine 62 which computes the power to be generated by the range extender 10.

If the cooling process flag is not set to true, decision block 60, the range extender routine will inquire, decision block 64 if a cooling required signal has been received by the vehicle system control 24 indicating that the engine coolant has exceeded a reference temperature $\theta_{ref}$ as indicated by decision block 64. In response to receiving a cooling required signal, the range extender routine will proceed to execute the engine cooling subroutine 66. Otherwise, the range extender routine will proceed to inquire decision block 61 if the loop timer has timed out. If the loop time has not timed out, i.e. loop time=T, where $T_j$ is either $T_1$ as set during the initialization 40 and in power computation subroutine 62 or the time $T_2$ set by the regenerative braking subroutine 58, the range extender routine will return to block 44 and continue to loop until the loop time is equal to $T_j$ or either the power computation or engine cooling subroutine, 62 and 66, respectively, are called-up.

After the loop timer times out, the range extender routine will again inquire if the cooling process flag is true, decision block 68. This assures that the internal combustion engine 34 will not remain in an overheated state even if the loop timer has timed out. If the cooling procedure flag is true, the range extender routine will again call-up and execute the engine cooling subroutine 66. Otherwise, the range extender routine will proceed to call-up and execute the power computation subroutine 62 which is the same subroutine called-up when the difference between consumed energy $P_{con}$ and the delivered energy $P_{del}$ is greater than the predetermined difference K. The power computation sub-subroutine 62 is also called-up during the engine cooling sub-subroutine 66 as shall be discussed relative to the flow diagram shown in FIG. 6.

After completion of the regenerative braking, engine cooling or power computation subroutines, 58, 66 and 62, respectively, the range extender routine will transmit the value of the requested power signal $P_{req}$ to the range extender 10, as indicated by block 70, so that the internal combustion engine 34 will drive the alternator 36 at the speed required to produce the requested power $P_{req}$. The range extender routine will subsequently inquire, decision block 72, if the state-of-charge (SOC) of the traction battery 32 is greater than a predetermined percent, B, of a full charge of the traction battery 30. In the preferred embodiment, B is equal to A and also has a value of 45%. If the state-of-charge of the battery 30 is less than B, the range extender routine will loop back to block 44 and continue to loop until the state-of-charge is greater than B. Otherwise, the range extender routine will return to the main program.

The details of the regenerative braking subroutine 58 are shown in FIG. 4. The regenerative subroutine begins by computing the average delivered power $\overline{P}_{del}$ delivered to the inverter/motor control 26 and the possible maximum regenerative power $P_{reg}$ produced by the motor 28 block 74. The average delivered energy $\overline{P}_{del}$ is computed in accordance with equation 3:

$$\overline{P}_{del} = \frac{P_{del}}{N} \quad (3)$$

where $P_{del}$ is the summation of the delivered power $P_{del}$ as previously discussed and N is the number of loops over which $P_{del}$ was summed.

The possible maximum deliverable regenerative energy $P_{reg}$ may be computed directly from the rotational speed $\omega$ of the motor 28 where:

$$P_{reg} = f(\omega) \quad (4)$$

where $f(\omega)$ is a stored conversion between the motor rotational speed to power output.

After computing $\overline{P}_{del}$ and $P_{reg}$, the regenerative braking subroutine proceeds to inquire decision block 76, if the sum of $P_{reg}$ and $\overline{P}_{del}$ is greater than a maximum charging rate $C_{max}$ for the traction battery 30. As previously described, the maximum charge rate $C_{max}$ is computed by the battery control 32 based on the battery's current state-of-charge and its temperature. The regenerative braking subroutine will proceed to set requested power $P_{req}$ equal to the difference between the maximum charging rate and the maximum regenerative power $(C_{max} - P_{reg})$ when $P_{reg} + \overline{P}_{del}$ is greater than $C_{max}$, block 76 or to the requested power $P_{req}$.

After the value of the requested power signal $P_{req}$ has been determined, the regenerative braking subroutine 58 will set the loop time at a time $T_2$, set $N=O$ $P_{con}=O$, $P_{del}=O$, set the timer equal to 0, and set the regen process flag to true as indicated by block 80, then return to the range extender routine. The time $T_2$ is selected to be a time sufficient to complete the regenerative braking by the vehicle.

Figure 5:
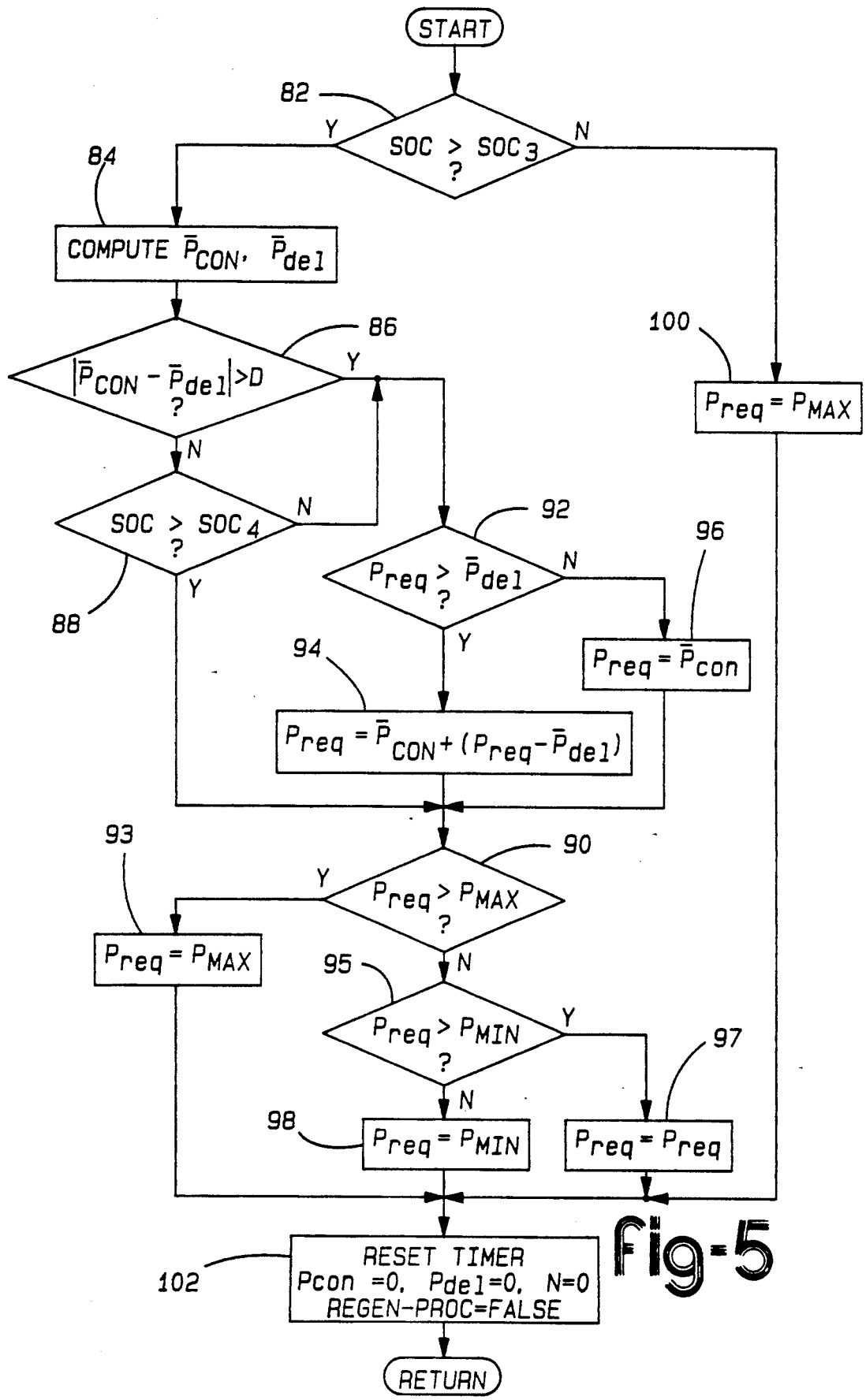
FIG. 5 is a flow diagram of the power requested computation subroutine.

The details of the power computation subroutine are shown in FIG. 5. The power computation subroutine begins by inquiring decision block 82 if the battery's state-of-charge (SOC) is greater than a third predetermined state-of-charge (SOC$_3$).

In the preferred embodiment, the third predetermined state-of-charge, SOC$_3$, is in the range from 20% to 25% of full charge. If the state-of-charge of the traction battery 30 is greater than SOC$_3$, the power computation subroutine 62 will compute the average consumed power $\overline{P}_{con}$ and the average delivered power $\overline{P}_{del}$ a as indicated by block 84. $\overline{P}_{del}$ is computed a previously described relative to the regenerative process 58 and $\overline{P}_{con}$ is computed as follows:

$$\overline{P}_{con} = \frac{P_{con}}{N} \quad (5)$$

where $P_{con}$ is the sum of the consumed power consumed by the inverter/motor system 12 over N loops of the power consumption subroutine.

The power computation subroutine the inquires decision block 86 if the absolute difference between $\overline{P}_{con}$ and $\overline{P}_{del}$ are greater than a predetermined value D. If not, the subroutine proceeds to inquire if the state-of-charge of battery 30 is greater than a predetermined value SOC$_4$ which preferably is about 40%. If SOC is greater than SOC$_4$, the power computation subroutine proceeds to decision block 90.

If the absolute value of $\overline{P}_{con} - \overline{P}_{del}$ is greater than D or the battery's state-of-charge is less than SOC$_4$, the energy computation subroutine will proceed to inquire, decision block 92, if the requested power signal $P_{req}$ is greater than the average delivered power $\overline{P}_{del}$. If so, the value of the new requested power signal $P_{reg}$ is set to be equal to the average consumed power $\overline{P}_{con}$ + the difference between the current requested energy $P_{req}$ and the average delivered power $\overline{P}_{del}$ as indicated by block 94 then proceeds to decision block 90.

Alternatively, if the value of $P_{req}$ is less than $\overline{P}_{del}$, the subroutine proceeds to set the requested power $P_{req}$ equal to the average power consumed $\overline{P}_{con}$ as indicated by block 96, then proceeds to decision block 90.

Decision block 90 inquires if the determined requested power $P_{req}$ is greater than the maximum power $P_{max}$ safely deliverable by the alternator 36. If so, $P_{req}$ is set to $P_{max}$ as indicated by block 93. When $P_{req}$ is not greater than $P_{max}$, the subroutine inquires, decision block 95 if $P_{req}$ is greater than a minimum power deliverable by the alternator 36. If so, the value of $P_{req}$ is set equal to $P_{req}$ as previously determined as indicated by block 97. Otherwise, the value $P_{req}$ is set equal to $P_{min}$ as indicated by block 98.

Returning to decision block 82, when the battery's state-of-charge is less than SOC$_3$, the subroutine will set the value of $P_{req}$ equal to $P_{max}$ as indicated by block 100.

After the value of the required power signal $P_{req}$ has been determined, the power computation subroutine 62 resets the loop timer, $P_{con}$, $P_{del}$, N to 0 and sets the regen process flag to false and set loop time equal to $T_1$ as indicated by block 102, then returns to the range extender subroutine.

Figure 6:
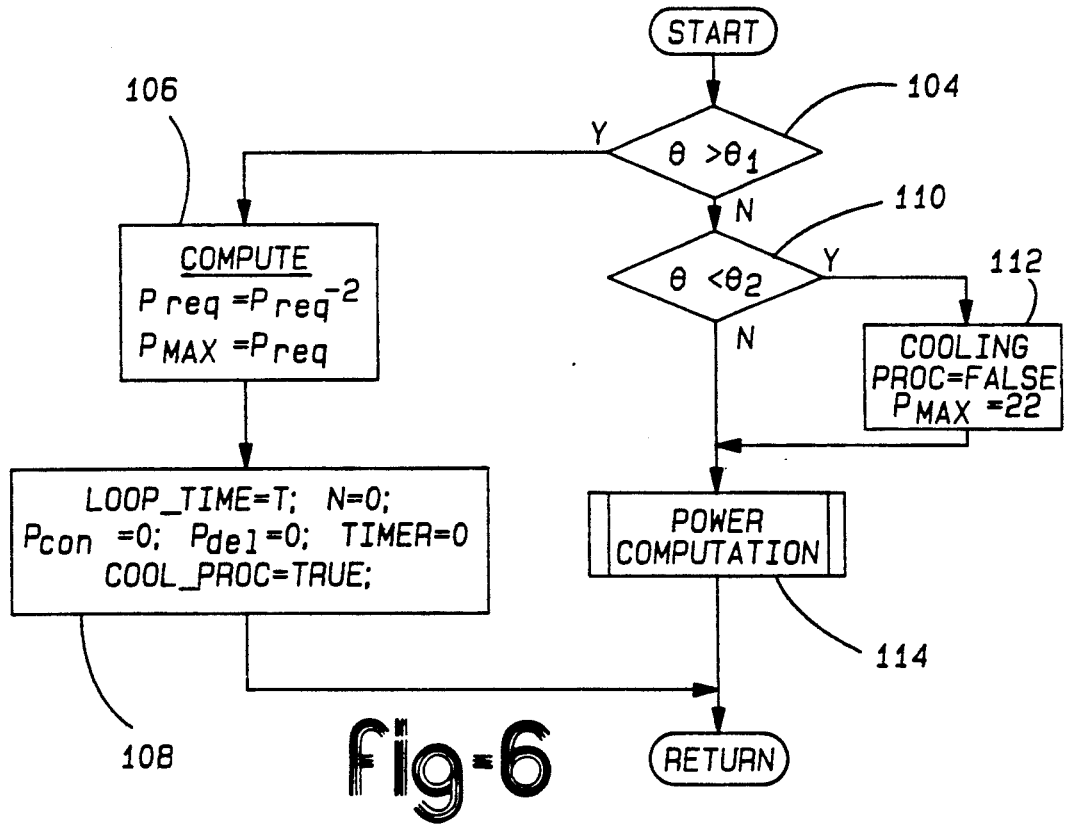
FIG. 6 is a flow diagram of the engine cooling subroutine.

The details of the engine cooling subroutine 6 are shown in FIG. 6. The engine cooling subroutine 66 begins by inquiring, decision block 104, if the engine coolant temperature $\theta$ is greater than a first predetermined temperature $\theta_1$, which, in the preferred embodiment, is approximately 105° C. (220° F.). If so, the engine cooling subroutine computes the value of the requested power signal $P_{req}$ to be equal to $P_{req} - 2$ kilowatts, then sets the maximum power $P_{max}$ to be generated by the alternator 36 to be equal to the newly computed $P_{req}$ as indicated by block 106. The subroutine then sets the loop time to be equal to $T_3$, the loop number $N=0$, $P_{con}=0$, $P_{del}=0$, the timer=0 and the cool process flag to be true, then returns to the range extender routine.

Alternatively, if the engine coolant temperature $\theta$ is less than 105° C., the subroutine will inquire, decision block 110, if the engine coolant temperature $\theta$ is less than a second predetermined temperature $\theta_2$. In a preferred embodiment, $\theta_2$ is approximately 82.5° C. (180° F.). If the engine coolant temperature $\theta$ is less than $\theta_2$, the maximum power $P_{max}$ is set equal to 22 kilowatts and the cooling process flag is set to false as indicated by block 112. When either $P_{max}$ is set equal to 22 kilowatts or $\theta$ is greater than 82.5° C., the sub-subroutine will proceed to execute the power computation subroutine 62 as indicated by block 114.

During the engine cooling subroutine, the value of $P_{max}$ is reduced by two (2) kilowatt as each time the subroutine is executed until the engine coolant temperature is less than 105° C.

While the method of the invention herein disclosed constitute presently preferred steps, many others are possible. It is not intended herein to mention all of the possible equivalent steps or ramifications of the invention. It is understood that the terms used herein are merely descriptive rather than limiting, and that various changes may be made without departing from the spirit or scope of the invention.

We claim:

1. A method for controlling the operation of a range extender for a hybrid electric vehicle having a battery system providing electric power to an electric drive system, said range extender comprising an internal combustion engine driving an alternator to provide a requested electric power supplementing the electric power provided by the battery system to increase the range of the hybrid electric vehicle, said method comprising the step of:

detecting a state-of-charge of the battery system to generate a state-of-charge signal having a value corresponding to a percentage of a full charge;

detecting the electric power being consumed by the electric drive system to generate a consumed power signal $p_{con}$ in response to said state-of-charge signal being less than a first predetermined value;

detecting the electric power being delivered by said range extender to generate a delivered power signal $P_{del}$ in response to said state-of-charge signal being less than said first predetermined value;

generating a requested power signal $P_{req}$ in response to said consumed power signal $P_{con}$ being greater than said delivered power signal $P_{del}$ by a predetermined difference, said requested power signal, $P_{req}$ having a new value causing said range extender to deliver sufficient electric power to said electric drive system and to said battery system to maintain the state-of-charge of said battery system within a preselected state-of-charge range;

activating said range extender to to deliver electric power having a value corresponding o the new value of said requested power signal $P_{reg}$ tending to maintain the difference between said consumed electric power and said delivered electric power to a value less than said predetermined difference; and repeating said step of detecting said state-of-charge through said step of activating said range extender until said state-of-charge is greater than a second predetermined value.

2. The method of claim 1 wherein said first predetermined value and said second predetermined value of said state-of-charge are approximately equal to 45% of full charge.

3. The method of claim 1 wherein said predetermined difference is equal to approximately 600 kw· second for said battery system having lead-acid batteries and equal to 3,600 kw· second for said battery system having sodium sulphur batteries.

4. The method of claim 1 wherein said step of generating said requested power signal $P_{req}$ comprises the step of:

generating said requested power signal having a value corresponding to a maximum value $P_{max}$ predetermined as a maximum power deliverable by said range extender when said state-of-charge is less than a third predetermined value;

generating said requested power signal having a value equal to an average consumed power value $\overline{P}_{con}$ in response to said state-of-charge being greater than said third predetermined value, in response to said value of said requested power signal $P_{req}$ being less than an average delivered power value $\overline{P}_{del}$, said requested power signal being less than said maximum value $P_{max}$ and greater than a minimum value, $P_{min}$, predetermined as a minimum power deliverable by the range extender;

generating said requested power signal having a value corresponding to the sum of said average consumed power value $\overline{P}_{con}$ plus the difference between a current value of said requested power signal $P_{req}$ and said average delivered power value $\overline{P}_{del}$, said requested power signal being less than said value of said maximum value $P_{max}$ and greater than said minimum value $P_{min}$; and generating said requested power signal having a value equal to the value of the current requested power signal $P_{req}$ in response to the absolute value of the difference between said average consumed power value $\overline{P}_{con}$ and said average delivered power value $\overline{P}_{del}$ being less than said predetermined difference, said state-of-charge being greater than a fourth predetermined value, said requested power signal being less than said maximum value $P_{max}$ and greater than said minimum value $P_{min}$.

5. The method of claim 4 wherein said third predetermined value of said state-of-charge is in the range from 20% to 25% and said fourth predetermined value of said state-of-charge is approximately 40%.

6. The method of claim 1 wherein said requested power signal $P_{req}$ has a maximum value $P_{max}$ predetermined as a maximum power deliverable by said range extender and a minimum value $P_{min}$ predetermined as a minimum power deliverable by said range extender said step of generating said requested power signal $P_{req}$ comprises the steps of:

generating said requested power signal to have a new value corresponding to said maximum value, $P_{max}$, when the value of said state-of-charge signal is less than a fifth predetermined value;

averaging said consumed power signals $P_{con}$ to generate an average consumed power value $\overline{P}_{con}$ in response to the value of said state-of-charge signal being greater than said fifth predetermined value;

averaging said delivered power signals $P_{del}$ to generate an average delivered power value $\overline{P}_{del}$ in response to the value of said state-of-charge signal being greater than said fifth predetermined value;

comparing said requested power signal $P_{req}$ with said average delivered power value $\overline{P}_{del}$ in response o the difference between said average consumed power value $\overline{P}_{con}$ and said average delivered power value, $\bar{P}_{del}$, being greater than a second difference value;

comparing said value of said state-of-charge with a sixth predetermined value in response to the difference between said average consumed power value $\bar{P}_{con}$ and said average delivered power value $\bar{P}_{del}$ being less than said second difference value;

setting said requested power signal equal to the existing requested power signal in response to state-of-charge being greater than said sixth predetermined value;

comparing said value of said existing requested power signal $P_{req}$ with said average delivered power value $\bar{P}_{del}$ in response to said value of said state-of-charge signal being less than said sixth predetermined value;

comparing said value of said requested power signal $P_{req}$ with said maximum value $P_{max}$, in response to said state-of-charge signal being greater than said sixth predetermined value;

computing a new value for said requested power signal in response to said existing value of said requested power signal being greater than said average delivered power value $\bar{P}_{del}$;

generating said value of said requested power signal $P_{req}$ to be equal to said average consumed power value $\bar{P}_{con}$ in response to said existing value of said requested power signal being less than said average delivered power, value $\bar{P}_{del}$;

comparing the new value of said requested power signal $P_{req}$ with said maximum value $P_{max}$ in response to generating said new value of said requested power signal $P_{req}$ being equal to said average consumed power value $\bar{P}_{con}$;

generating a new value of said requested power signal $P_{req}$ to be equal to said maximum value $P_{max}$ in response to said new value of said requested power signal being greater than said maximum value $P_{max}$;

comparing said new value of said requested power signal with said minimum value $P_{min}$ to generate said new value of requested power signal to be equal to said minimum value $P_{min}$ in response to said new value of said requested power signal being less than said minimum value $P_{min}$ and to generate said requested power signal having a new value corresponding to the existing value in response to said state-of-charge signal being greater than said sixth predetermined value, said existing value being less than said maximum value $P_{max}$ and greater than said minimum value $P_{min}$, to generate said requested power signal having said generated new value when said new value is less than said maximum value $P_{max}$ and greater than said minimum value $P_{min}$ and to generate said requested power signal having said new value equal to said average consumed power value $\bar{P}hd$ con in response to id new value being less than said maximum value $P_{max}$ and greater than said minimum value $P_{min}$.

7. The method of claim 1 wherein said electric drive system comprises a motor which may function in the alterative as an electric motor or an electric generator and a motor control having means for generating a signal indicating that said motor is functioning as an electric generator, providing electric power to said battery system, said method further comprising the step of controlling the electric power being delivered by said range extender to prevent said battery system from being charged at a rate greater than a maximum charge rate in response to said signal indicting said motor is functioning as an electric generator.

8. The method of claim 7 wherein the step of controlling the electric power being delivered by said range extender in response to said signal indicating said motor is functioning as an electric generator comprises the step of;

detecting the occurrence of said signal indicating that said motor is functioning as an electric generator to compare the rotational speed of said motor with a minimum motor speed;

averaging the delivered power signal $P_{del}$ to generate an averaged delivered power value $\bar{P}_{del}$ in response to said rotational speed of said motor being greater than said minimum motor speed;

computing a maximum regenerative power signal $P_{reg}$ indicative of the regenerative electric power being generated by said motor as a function of the rotational speed of said motor;

comparing the sum of said average delivered power value $\bar{P}_{del}$ and said maximum regenerative power signal $P_{reg}$ with a maximum charge rate $C_{max}$ to generate a requested power signal $P_{req}$ having a value equal to a difference between said maximum charge rate $C_{max}$ minus said maximum regenerative power signal $P_{reg}$ in response to the sum of maximum regenerative power signal $P_{reg}$ and said averaged delivered power value $\bar{P}_{del}$ being greater than said maximum charge rate $C_{max}$; and generating a new requested power signal $P_{req}$ having a value equal to the exiting requested power signal $P_{req}$ in response to the sum of said maximum regenerative power signal $OP_{reg}$ and said averaged delivered power value $\bar{P}_{del}$ being less than said maximum charge rate $C_{max}$.

9. The method of claim 1 further comprising the step of controlling the value of said requested power signal $P_{req}$ to maintain the temperature of a coolant of said range extender internal combustion engine below a predetermined maximum coolant temperature $\theta_1$.

10. The method of claim 9 wherein said step controlling the value of said requested power signal $P_{reg}$ comprises the steps of:

comparing an actual coolant temperature of said coolant in the range extender internal combustion engine to said predetermined maximum coolant temperature $\theta_1$ to decrease the value of sad requested power signal $P_{req}$ by a predetermined amount in response to said actual coolant temperature being greater than said predetermined maximum coolant temperature and to compare said actual coolant temperature with a desired coolant temperature when said actual coolant temperature is less than said predetermined maximum coolant temperature;

generating a maximum power having a predetermined maximum value $P_{max}$ in response to said coolant temperature being less than said desired coolant temperature;

generating in response to said coolant temperature being greater than said desired coolant temperature or the generating of said maximum value $P_{max}$, a requested power signal $P_{req}$ having a value computed to maintain said state-of-charge of said battery system within said preselected state-of charge range.

11. A method for controlling he operation of a range extender for a hybrid electric vehicle having a battery system providing electric power to an dielectric drive, said range extender system comprising an internal combustion engine driving an alternator to deliver electric power in response to a requested power signal, $P_{req}$, supplementing the electric power provided by the battery system to increase the range of the hybrid electric vehicle, and said electric drive system including a motor having a first state in which said motor functions as an electric motor and switchable to a second state in response to a signal causing said motor to function as an electric generator, said method comprising the steps of:

detecting a value corresponding to a percentage of a full charge of said battery system to generate a state-of-charge signal;

measuring the electric power being consumed by said electric drive system to generate a consumed power signal, $P_{con}$, having a value corresponding to the value o the electric power being consumed by the electric drive system in response to the value of said state-of-charge signal being less than a first SOC value;

measuring the electric power being delivered by said range extender to generate a delivered power signal $P_{del}$ having a value corresponding o the value of said delivered electric power in response to the value of said state-of-charge signal being less than said first SOC value;

generating a requested power signal $P_{req}$ in response to said value of said consumed power signal $P_{con}$ being greater than said value of said delivered power signal $P_{del}$ by a predetermined difference value, said requested power signal $P_{req}$ having a new value causing said range extender to deliver sufficient electric power to said electric drive system and to said battery system to maintain the state-of-charge of said battery system within a predetermined state-of-charge range between said first SOC value and a second SOC value;

activating said range extender in response to said requested power signal $P_{req}$ to deliver said sufficient electrical power;

controlling said electric power delivered by said range extender in response to said motor being switched to said second state so that the sum of the electric power being generated by said motor in said second state and said electric power being delivered by said range extender does not exceed a maximum charge rate of said battery system;

reducing said electric power being delivered by said range extender in response to said requested power signal $P_{req}$ to reduce the temperature of a coolant in said internal combustion engine in response to the temperature of said coolant exceeding a predetermined temperature;

repeating said step of detecting the state-of-charge of said battery system through said step of reducing said electric power to reduce said temperature of said coolant until said state-of-charge is greater than said first SOC value.

12. The method of claim 11 wherein said step of generating a requested power signal $P_{req}$ comprises the step s of:

generating said requested power signal having a value corresponding to a value $P_{max}$, predetermined as the maximum electric power deliverable by said range extender when said state-of-charge is less than a third SOC value;

generating a requested power signal having a value equal to an average consumed power value $\overline{P}_{con}$ in response to state-of-charge being greater than a fourth SOC value, said value of said requested power signal $P_{reg}$ being less than said value $P_{max}$ and greater than a value $P_{min}$ predetermined to be the minimum power $P_{min}$ deliverable by said range extender;

generating said request power signal $P_{req}$ having a value corresponding o the sum of said average consumed power value $\overline{P}_{con}$ plus the difference between a current value of said requested power signal $P_{req}$ and an average delivered power value $\overline{P}_{del}$, said requested power signal being less than said value $P_{max}$ and greater than said value $P_{min}$; and generating said requested power signal having a value equal to the value of the current requested power signal $P_{req}$ in response to the absolute value of the difference between said average consumed power value $\overline{P}_{con}$ and said a average delivered power value $\overline{P}_{del}$ being less than a predetermined difference value, said state-of-charge being greater than a fourth SOC value, said requested power signal being less than said value $P_{max}$ and greater than said value $P_{min}$.

13. The method of claim 11 wherein said state of controlling the electric power being delivered by said range extender in response to said signal indicating said motor is functioning as an electric generator comprises the steps of:

detecting the occurrence of said signal signifying that said motor is functioning as an electric generator to compare a rotational speed of said motor with a minimum rotational speed;

averaging said delivered power signal $P_{del}$ to generate an averaged delivered power value $\overline{P}_{del}$ in response to said rotational speed of said motor being greater than said minimum motor speed;

computing a maximum regenerative power signal $P_{rg}$ capable of being generated by said motor as a function of said rotational speed of said motor;

comparing the sum of said average delivered power value $\overline{P}_{del}$ and said maximum regenerative power signal $P_{reg}$ with a maximum charge rate $C_{max}$ to generate said requested power signal having a value equal to a difference between said maximum charge rate $C_{max}$ minus said maximum regenerative power signal $P_{reg}$ in response to the sum of said maximum generative power signal $P_{reg}$ and said averaged delivered power value $\overline{P}_{del}$ being greater than the maximum charge rate $C_{max}$; and generating a new requested power signal having a value equal to the existing requested power signal in response to the sum of said maximum generative power signal $P_{reg}$ and said averaged delivered power value $\overline{P}_{del}$ being less than said maximum charge rate $C_{max}$.

14. The method of claim 11 wherein said step of reducing said electric power comprises the steps of:

comparing an actual temperature of said coolant to said predetermined temperature to decrease the value of said requested power signal $P_{req}$ by a predetermined amount in response to said actual temperature of said coolant being greater than said predetermined temperature;

comparing said actual temperature of said coolant with a desired coolant temperature when said actual temperature of said coolant is less than said predetermined temperature;

generating a requested power signal $P_{req}$ having a predetermined maximum value $P_{max}$ in response to said temperature of said coolant being less than said desired coolant temperature;

generating in response to said temperature of said coolant being greater than said desired coolant temperature or the generating of said requested power signal having said maximum power value $P_{max}$, said requested power signal $p_{req}$ having a value calculated to maintain said state-of-charge of said battery system within said predetermined range.

15. A range extender for a hybrid electric vehicle having a battery system providing electric power to an electric drive system, said electric drive system having a motor having a first state in which it operates as an electric motor and a second state in which it operates as an electric generator to provide electric power to charge said battery system, said range extender comprising:

an alternator for generating electric power;

an internal combustion engine producing a rotary output driving said alternator at a speed controlled by the value of a requested power signal, $P_{req}$;

a first sensor generating a state-of-charge signal having a value corresponding o the state-of-charge of said battery system;

a second sensor generating a consumed power signal $P_{con}$ corresponding to the electrical power being consumed by said electric drive system;

a third sensor generating a delivered power signal $P_{del}$ corresponding to the electrical power being delivered by said alternator;

means or generating said requested power signal $P_{req}$ in response to said value of said state-of-charge signal being less than a first state-of-charge value and said value of said consumed power signal $P_{con}$ being greater than said value of said delivered power signal $P_{del}$ by a predetermined quantity, said requested power signal $P_{req}$ having a value causing said range extender to deliver sufficient electric power to said electric drive system and to said battery system to maintain said state-of-charge of said battery system within a predetermined range;

means for controlling the value of said delivered power signal $P_{del}$ by said range extender in response to said motor being in said second state to prevent the sum of the electric power generated by said motor in said second state and said delivered power generated by said range extender from exceeding a maximum charge rate for said battery system; and means for reducing the value of said requested power signal $P_{req}$ to reduce the load on said engine of said range extender and thereby reducing the temperature of said internal combustion engine in response to the temperature of a coolant of said engine exceeding a predetermined temperature.

* * * * *